United States Patent

[11] 3,592,103

| [72] | Inventor | William B. Brown<br>Pasadena, Md. |
|---|---|---|
| [21] | Appl. No. | 832,349 |
| [22] | Filed | June 11, 1969 |
| [45] | Patented | July 13, 1971 |
| [73] | Assignee | Western Electric Company, Incorporated<br>New York, N.Y. |

[54] APPARATUS FOR REMOVING MATERIAL FROM A WORKPIECE
9 Claims, 9 Drawing Figs.

[52] U.S. Cl. .................................................. 90/88,
90/11 R, 90/18, 90/24 E, 90/63, 90/64, 90/481
[51] Int. Cl. ...................................................B23d 41/06,
B23d 37/14
[50] Field of Search.......................................... 90/11, 18,
11.3, 24.03, 24.05, 63, 88, 87, 64, 24; 83/914;
29/481

[56] References Cited
UNITED STATES PATENTS

| 1,707,279 | 4/1929 | Retterath | 90/24 X |
|---|---|---|---|
| 2,169,824 | 8/1939 | Tubbs | 90/11 (.3) |
| 3,110,227 | 11/1963 | Croucher | 90/64 |

*Primary Examiner*—Gil Weidenfeld
*Attorneys*—H. J. Winegar, R. P. Miller and Don P. Bush ABSTRACT: In order to remove flash from a weld of butt-welded sections of rod, four eccentrically mounted cutting wheels are positioned around the periphery of the rod adjacent to the weld. Each wheel has a plurality of cutting blades attached thereto which have paths of movement that overlap the paths of movement of other blades positioned on adjacent wheels when the blades are in cutting engagement with the flash. Each wheel is relieved along a chord thereof to form a straight section for initially accommodating the welded sections of rod before the milling operation is commenced. The eccentric mounting arrangement results in progressively deeper milling of the flash as the wheels are rotated.

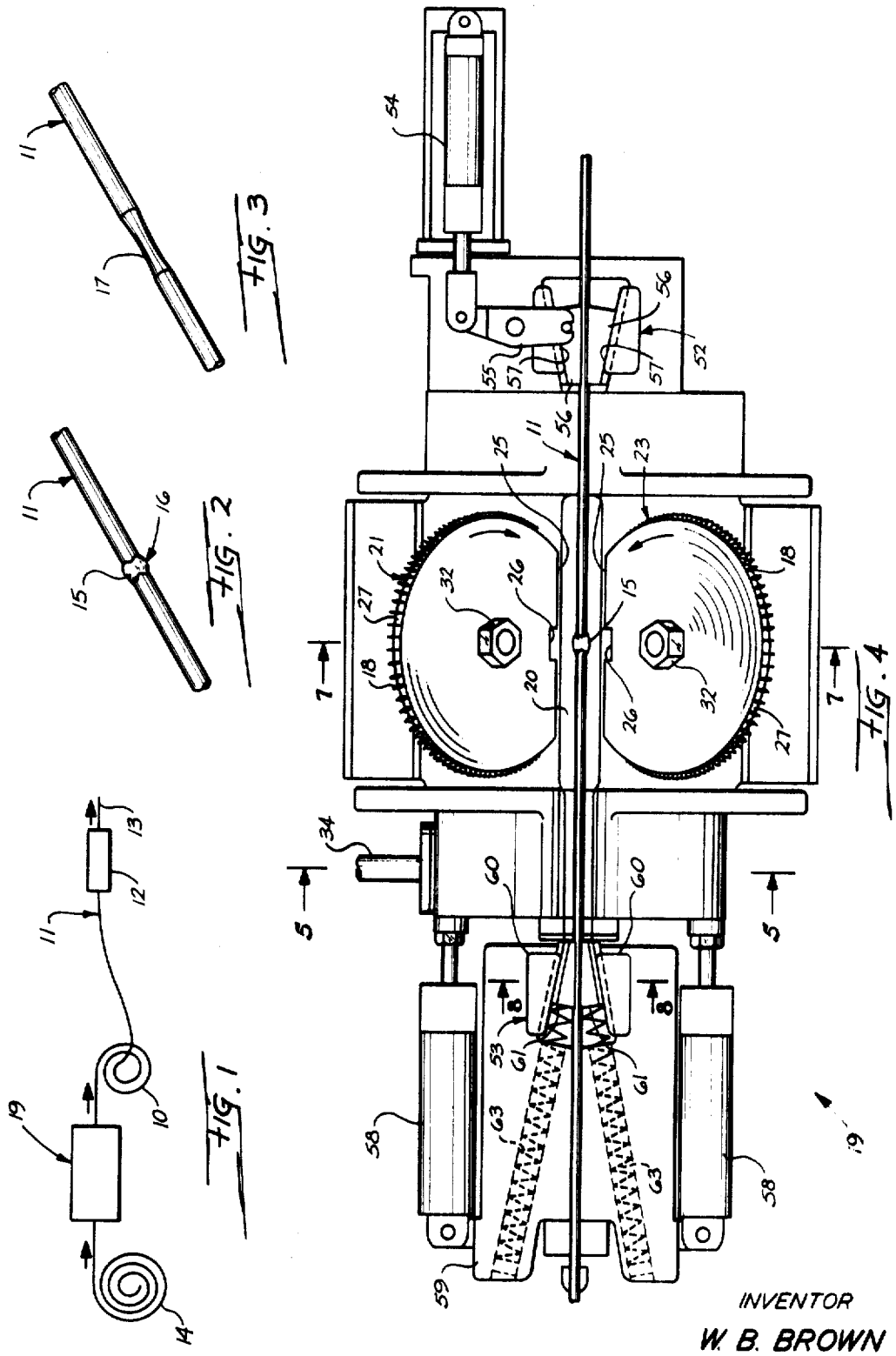

APPARATUS FOR REMOVING MATERIAL FROM A WORKPIECE

BACKGROUND OF THE INVENTION

1. Field of the Invention

This invention relates to apparatus for removing material from a workpiece and more particularly, but not exclusively, to apparatus for removing undesirable material from a joint.

2. Description of the Prior Art

In manufacturing wire, it is standard practice to draw the wire from coils of relatively large-diameter rod stock. In order to run the manufacturing process continuously, it has been found necessary to weld the ends of rod coils together using a flash-producing, butt-weld technique. This technique results in an upset flash burr which must be removed before the wire is drawn to prevent wire breakage and irregularities as the rod is passed through drawing dies.

Currently the method for removing undesirable flash has been to break off as much of the flash as practical with pliers and then manually file the remaining flash until none remains. This is obviously a time-consuming operation involving high labor costs and in some instances limits the speed of a drawing operation.

SUMMARY OF THE INVENTION

It is, therefore, an object of this invention to provide new and improved apparatus for removing material from a workpiece.

A further object of this invention is to provide new and improved apparatus for removing undesired material from an elongated element.

Another object of this invention is to provide new and improved apparatus for removing flash and weld burrs from the joint of two butt-welded sections of rod.

Still another object of this invention is to provide new and improved apparatus for removing undesired material from a stationary workpiece by using rotating cutters having blades with overlapping paths of travel.

A further object of this invention is to provide apparatus for removing material from a workpiece wherein the workpiece may be readily positioned for machining with a minimum of effort and hazard.

Apparatus illustrating certain features of the invention may include means for holding a predetermined portion of a workpiece stationary, cutting elements having material-removing means thereon disposed adjacent the workpiece and means for moving the material-removing means into engagement with the workpiece. The cutting elements and the material-removing means are positioned so that the material-removing means have overlapping paths of travel when in engagement with the workpiece and thereby cooperate to define the desired contour of the workpiece after the material has been removed.

BRIEF DESCRIPTION OF THE DRAWINGS

Other objects and features of the present invention will be more readily understood from the following detailed description of specific embodiments thereof when read in conjunction with the appended drawings, in which:

FIG. 1 is a schematic diagram of a process in which a flash removal machine embodying certain principles of the present invention may be employed.

FIG. 2 is a perspective view of two sections of rod welded together prior to removal of flash therefrom.

FIG. 3 is a perspective view of the welded rod of FIG. 2 with the flash removed.

FIG. 4 is a plan view of a flash removal machine embodying certain principles of the present invention.

DETAILED DESCRIPTION

Figure 5:
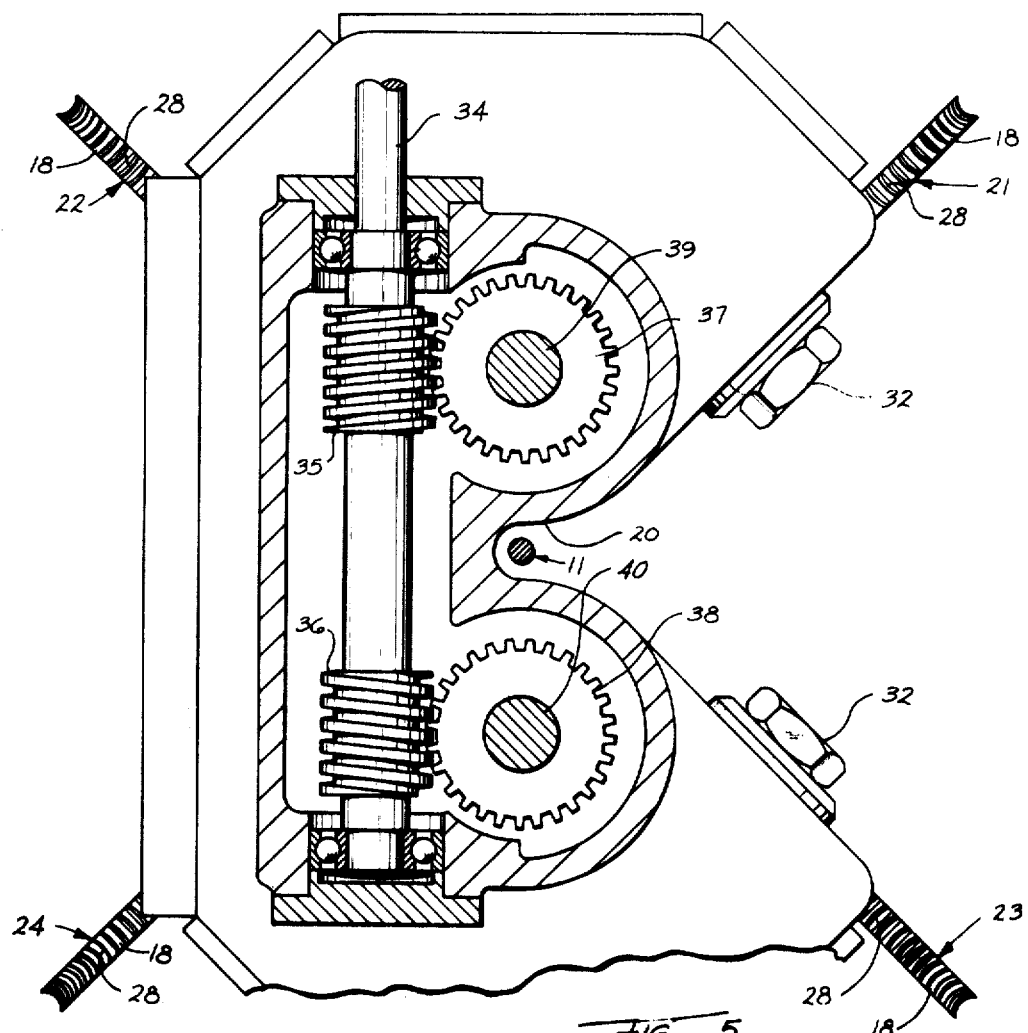
FIG. 5 is an enlarged sectional view of the machine of FIG. 4 taken along line 5-5 thereof showing a portion of a driving mechanism of the machine.

Referring now to the drawings and more particularly to FIG. 1 thereof, there is shown diagrammatically a coil 10 of a rod, designated generally by the numeral 11, which is drawn through a series of drawing dies (not shown) of a wire-drawing machine, illustrated diagrammatically as 12, to form a relatively small wire 13. In order to keep the wire-drawing operation running continuously, it is necessary to butt-weld another coil 14 to the coil 10 before the coil 10 is passed completely through the drawing machine 12. This welding procedure is duplicated repeatedly as long as it is desired to run the process continuously.

As shown in FIG. 2, flash 15 is produced at a joint, designated generally by the numeral 16, formed when the coil 10 (FIG. 1) of the rod 11 is welded to the coil 14 (FIG. 1) of the rod to interconnect adjacent ends of the two coils. Prior to drawing the rod 11 through the dies of the wire-drawing machine 12 (FIG. 1), it is necessary to remove the flash 15 so that the rod will continue to pass smoothly through the drawing dies. During the flash removal process, the rod 11 is undercut or necked down at the portion 17 by cutting blades 18-18 after the blades mill away the upset flash 15.

There are several advantages to undercutting the rod 11. First, the surface hardness at the joint 16 and the area around the joint is relatively high and could interfere with the passage of the rod through the dies of the wire-drawing machine 12. By removing the surface along the weld portion of the joint 17, the softer subsurface is exposed allowing the rod 11 to be drawn smoothly through the dies (not shown) of the wire-drawing machine 12. Secondly, since the diameter of the rod 11 at the undercut 17 is not particularly critical and may undergo considerable variation before resulting in adverse consequences, the operator of a flash removal machine, designated generally by the numeral 19, which is the subject of the present invention and will be discussed later, need not center the rod precisely each time the machine is used in order to remove all of the flash 15. Finally, an allowable variation of the diameter of the rod 11 at 17 allows you to sharpen the blades 18-18 many times before the blades need replacing.

Figure 6:
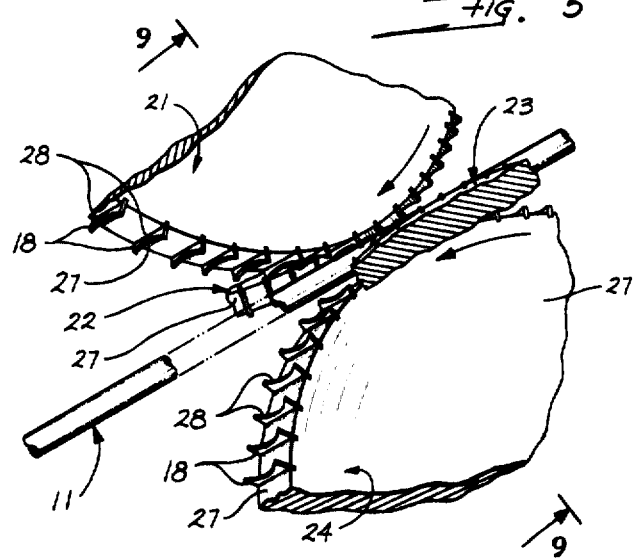
FIG. 6 is an enlarged perspective view of cutting wheels and blades of the machine of FIG. 4 in which the flash is being removed from the welded rod joint.

FIG. 4 is a plan view of the entire flash removal machine 19. The rod 11 is shown in position to be milled by cutting wheels, designated generally by the numerals 21, 22, 23, and 24 (FIG. 6). As seen in FIGS. 4, 5, and 6, the cutting wheels or chucks 21, 22, 23, and 24 are disposed at 90° intervals about a working area or slot, designated generally by the numeral 20, in which the rod 11 is positioned. Each of the wheels 21, 22, 23, and 24 has been relieved along a chord thereof to provide bladeless straight sections 25-25 (FIG. 4). Each of the straight sections 25-25 are provided with slots 26-26 which are used as guides to locate the burr or flash 15 in a predetermined position when the rod 11 is clamped in place (FIG. 4). The straight sections 25-25 enable the operator to simply slide the welded rod 11 laterally into place and the slots 26-26 enable him to quickly longitudinally align the rod in its optimum cutting position. Since the rod 11 is surrounded by the blades 18-18 during the cutting operation, the bladeless straight sections 25-25 eliminate the necessity for elaborate mechanisms to shift the cutting wheels 21, 22, 23, and 24 out of the way prior to inserting the rod.

Figure 9:
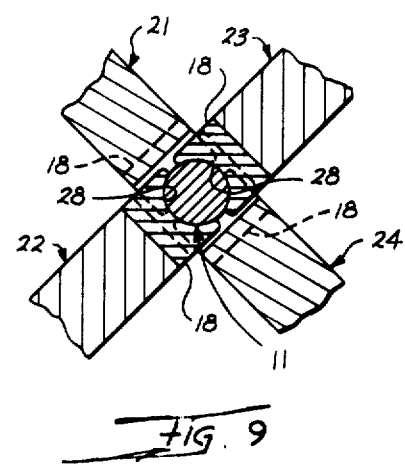
FIG. 9 is a sectional view taken along line 9-9 of FIG. 6 showing how the blades support the rod as they cut into it.

Referring to FIGS. 6 and 9, each of the cutting wheels 21, 22, 23, and 24 has a plurality of the cutting blades 18-18 disposed in spaced relation about arcuate portions 27-27 of the peripheries of the cutting wheels. Each of the blades 18-18 has a concave cutting surface 28 which generally accommodates the convex surface of the rod 11. As seen in FIGS. 6 and 9, the blades 18-18 on opposite sides of the rod 11 cut the flash 15 (FIG. 2 and FIG. 4) simultaneously so that the rod 11 is supported on both sides and is stabilized. Blades 18-18 on normally disposed adjacent wheels, for example, wheels 21 and 23, are, however, staggered and overlap one another in a mesh-type arrangement (FIG. 6) as they cut the flash 15 (FIG. 4) from the rod 11. The overlap ensures that none of the flash 15 is left remaining on the rod 11 and results in the previously discussed reduced portion 17 (FIG. 3).

Figure 7:
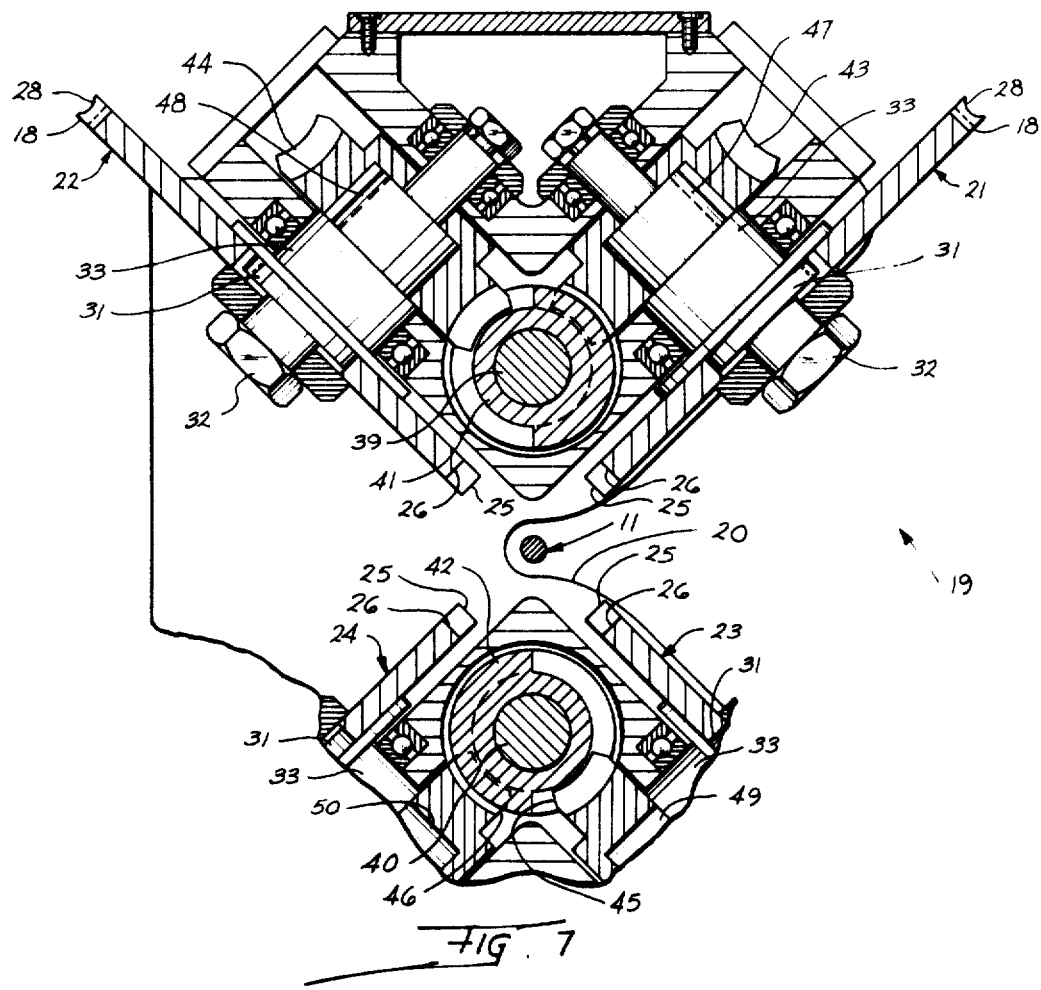
FIG. 7 is an enlarged sectional view of the machine of FIG. 4 taken along line 7-7 thereof, with portions of the machine broken away, showing the cutting wheels and the cutting wheel drive gears.

The blades 18-18 must be advanced successively so that each blade cuts a little closer to the axis of the rod 11 until all of the flash 15 is removed. This is accomplished by rotating eccentrically the cutting wheels 21, 22, 23, and 24 as shown in FIG. 7. The cutting wheels 21, 22, 23, and 24 are centered on spindles 31-31 and secured thereto by nuts 32-32. The spindles 31-31 are integral with journals 33-33 and are offset slightly from the center of the journals so that as the journals rotate, the spindles 31-31 and the associated wheels 21, 22, 23, and 24 rotate and follow eccentric paths. Accordingly, the blades 18-18 follow eccentric paths with the arcuate rims 27-27 of the wheels 21, 22, 23, and 24 and thereby progressively cut away the upset flash 15 (FIG. 2) and cut into the portion 17 of the rod 11 adjacent the weld 16 (FIG. 3).

Referring to FIG. 5, the wheels 21, 22, 23, and 24 are driven by a power shaft 34 attached to a motor (not shown). The power shaft 34 has a pair of opposite-hand helical gears 35 and 36 secured thereto. The helical gears 35 and 36 engage gears 37 and 38, respectively, rotating them in opposite directions at the same speed. The gears 37 and 38 are keyed to shafts 39 and 40, respectively, the first of which drives wheels 21 and 22, and the other which drives wheels 23 and 24. Referring to FIG. 7, keyed to the shafts 39 and 40 are helical gears 41 and 42, respectively, which rotate in opposite directions. The helical gear 41 engages gears 43 and 44 on one side of the machine and the helical gear 42 engages gears 45 and 46 on the opposite side of the machine. The gears 43, 44, 45, and 46 are, in turn, keyed to shafts 47, 48, 49, and 50, respectively, which rotate the respective wheels 21, 22, 23, and 24 so that the components of the movement of the cutting surfaces 28-28 of the cooperating wheels, which are parallel to the axis of the rod 11, are oriented in the same direction.

Each cutting cycle requires only one revolution of the cutting wheels 21, 22, 23, and 24. At the end of each cutting cycle, the relieved straight sections 25-25 are aligned with the slot or working area 20 and the machine is ready to receive another rod 11.

Figure 8:
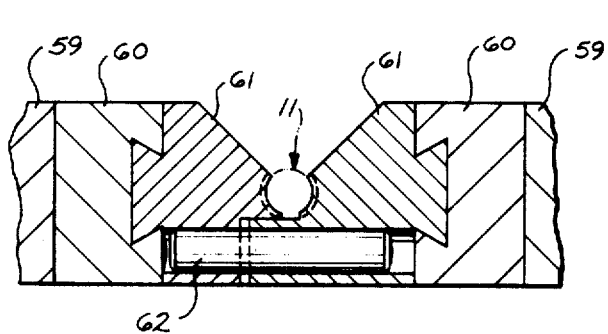
FIG. 8 is an enlarged sectional view of the machine of FIG. 4 taken along line 8-8 thereof showing one of the rod clamps.

Referring again to FIG. 4, the rod 11 is shown clamped by two clamps, generally designated by numerals 52 and 53. The clamp 52 is operated by a hydraulic cylinder 54 which rotates a bellcrank 55 to slide a pair of wedges 56-56 to the left within a pair of associated bevels 57-57 thereby camming the wedges together to tightly grip the rod 11. After the clamp 52 is secured, the clamp 53 is operated by a pair of hydraulic cylinders 58-58 which slide a plate 59 to the left. A pair of cams 60-60 are secured rigidly to the plate 59 and engage a pair of spring-biased wedges 61-61 joined by a pin 62 (FIG. 8). Compression springs 63-63, which are seated in the plate 59, urge the wedges 61-61 to the right as the cams 60-60 slide left until the rod 11 is gripped by the wedges. The wedges 61-61 can then no longer slide left relative to the plate 59 because the wedges are secured in place by the cams 60-60 and the rod 11. The clamp 53 continues to move to the left after the rod 11 has been gripped tightly and in so doing pulls the rod taut and straightens the section of the rod between the clamps 52 and 53. The rod 11 is now positioned for milling by the teeth 18-18 on the wheels 21, 22, 23, and 24.

Operation

The rod 11 is inserted in the clamps 52 and 53 with the flash 15 aligned between the slots 26-26 of the cutting wheels 21, 22, 23 and 24. The wedges 56-56 of the clamp 52 are then slid slightly to the left to grip the rod 11, and the cams 60-60 of the clamp 53 are slid slightly to the left to tension and thereby straighten the rod.

As seen in FIG. 4, after the rod 11 is secured in position, the cutting wheels 21, 22, 23 and 24 are rotated at the same speed with wheels 21 and 22 rotating in a clockwise direction and wheels 23 and 24 rotating in a counterclockwise direction so that the corresponding blades 18-18 on each of the wheels approach the rod 11 from the same direction relative to the axis thereof and at substantially the same speed. Since the wheels 21, 22, 23 and 24 are mounted at the geometric centers of the arcuate portions 27-27 thereof on eccentrically mounted spindles 31-31 (FIG. 7), the blades 18-18, which are all the same size and are positioned on the arcuate portions, advance toward the axis of the rod 11 while cutting through the flash 15. As seen in FIG. 3, the blades 18-18 actually undercut the flash 15 resulting in the undercut portion 17.

As seen in FIG. 9, the blades 18-18 on adjacent wheels overlap one another while cutting away the flash 15 and undercutting the rod 11. Since the blades 18-18 are staggered and since each successive blade advances closer to the axis of the rod 11, the trailing blades on wheels 21 and 24, as seen in FIG. 9, cut a little deeper into the material being removed than the leading blades on wheels 22 and 23. This series of progressively deeper overlapping cuts results in the undercut portion 17 of the rod 11 (FIG. 3).

One rotation of the cutting wheels 21, 22, 23 and 24 removes and undercuts all of the flash 15. Then the cams 61-61 and the wedges 56-56 both slide to the right to release the rod 11 from the clamps 53 and 52. The rod 11 may then be laterally lifted from the machine 19. Since the wheels 21, 22, 23 and 24 have undergone one rotation, the bladeless straight sections 25-25 are again facing the slot 20 and the machine 19 is ready to receive another rod 11.

What I claim is:
1. An apparatus for removing material from a predetermined portion of the periphery of a workpiece, which comprises:
   means for holding a predetermined portion of a workpiece from which material is to be removed in a fixed predetermined position;
   a plurality of cooperating cutting elements disposed adjacent to the predetermined position in which the portion of the workpiece is adapted to be positioned, each of said cutting elements having at least one rigid material-removing means thereon adapted to project toward the predetermined position in which the portion of the workpiece is designed to be positioned;
   the material-removing means on said adjacent cooperating elements being staggered with respect to each other, and
   means for moving the material-removing means through predetermined arcuate paths of travel, the path of travel of said material-removing means on at least one of the cutting elements extending into the path of travel of at least one of the adjacent material-removing means on at least one of the other cooperating cutting elements so that the paths of travel of adjacent portions of the adjacent cooperating material-removing means overlap while removing material from the predetermined portion of the workpiece and the inner boundaries of portions of the paths of travel of the material-removing means cooperate to define the desired contour of the outer periphery of the portion of the workpiece from which the material is removed.

2. The apparatus of claim 1 wherein said cutting elements are wheels relieved along chords thereof to facilitate insertion of the workpiece in said fixed predetermined position.

3. The apparatus of claim 1 wherein the cutting elements are disposed around the entire periphery of the workpiece and the paths of travel of the material-removing means of each of the adjacent cutting elements overlap each other so as to remove material from the entire periphery of the predetermined portion of the workpiece.

4. The apparatus of claim 1 wherein said cutting elements are disposed at 90° intervals around the periphery of the workpiece and wherein the material-removing means on said cutting elements which are diametrically opposed are also directly opposed when said paths of travel thereof bring said material-removing means into engagement with the workpiece to support the workpiece while the material is being removed.

5. The apparatus of claim 1 wherein said means for moving the material-removing means through predetermined paths of travel further includes means for advancing successive material-removing means on each cutting element closer to the axis of the workpiece as the material-removing means progress through the predetermined position in which the portion of the workpiece from which the material is to be removed is being held.

6. The apparatus of claim 5 wherein the cutting elements are eccentrically mounted wheels adapted to advance successive material-removing means closer to the axis of the workpiece.

7. The apparatus of claim 6 wherein said wheels are relieved along chords thereof to facilitate insertion of the workpiece in said fixed predetermined position.

8. The apparatus of claim 1 wherein each material-removing means is a blade terminating in a cutting edge for removing material from the workpiece.

9. The apparatus of claim 8 wherein said cutting edges of each of said blades have concave configurations which cut a series of interconnecting convex surfaces on said predetermined portion of said workpiece.